No. 628,713. Patented July 11, 1899.
W. N. HOUGHTALING.
COLLAR SUPPORTER FOR HARNESS.
(Application filed Aug. 1, 1898.)

(No Model.)

Witnesses
William N. Houghtaling
Inventor

UNITED STATES PATENT OFFICE.

WILLIAM N. HOUGHTALING, OF ANSONIA, CONNECTICUT.

COLLAR-SUPPORTER FOR HARNESS.

SPECIFICATION forming part of Letters Patent No. 628,713, dated July 11, 1899.

Application filed August 1, 1898. Serial No. 687,391. (No model.)

*To all whom it may concern:*

Be it known that I, WILLIAM N. HOUGHTALING, of Ansonia, in the county of New Haven and State of Connecticut, have invented a new Improvement in Horse-Collar Supporters; and I do hereby declare the following, when taken in connection with the accompanying drawings and the letters of reference marked thereon, to be a full, clear, and exact description of the same, and which said drawings constitute part of this specification, and represent, in—

Figure 1:
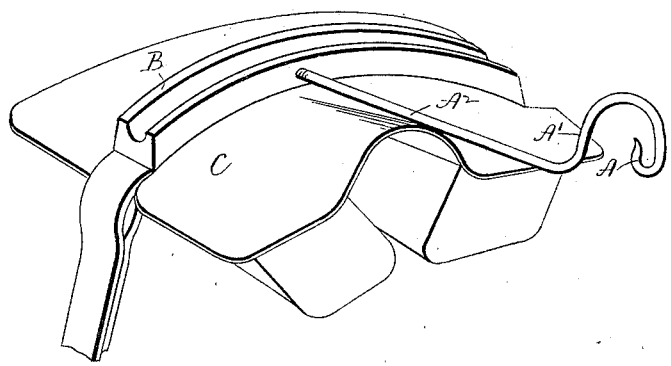
Figure 2:
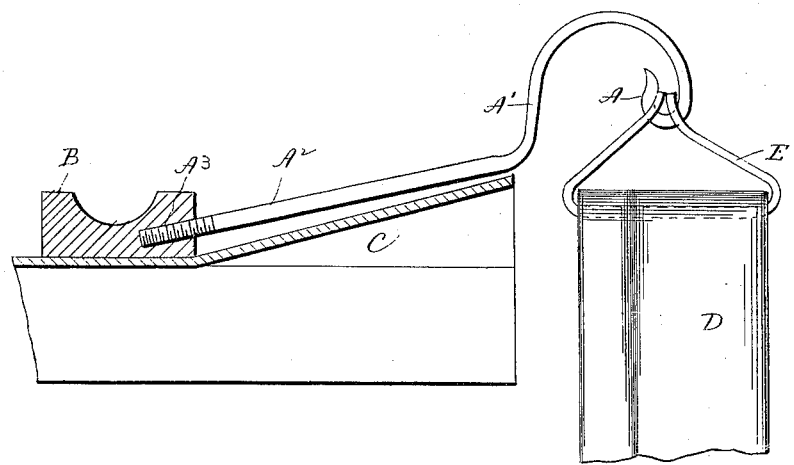

Figure 1, a perspective view of a saddle provided with a horse-collar supporter constructed in accordance with my invention; Fig. 2, a view showing the supporter as in use, the saddle being shown in section, while the supporter and collar are shown in side elevation.

My invention relates to an improvement in harnesses, and more particularly to hame-collar supporters for truck-saddle harnesses, the object being to provide simple, convenient, and effective means for supporting the hame-collar of a truck-saddle harness from the saddle and in such position that it will relieve the horse's neck and avoid the chafing thereof.

With these ends in view my invention consists in certain details of construction, as will be hereinafter described, and pointed out in the claim.

In carrying out my invention as herein shown the hame-collar supporter is formed from a single piece of metal, such as a steel rod, and comprises a hook A, a loop A', a shank A², and a threaded stem A³, which latter is entered in an inclined position into the central portion of the forward edge of the wooden chain-bow B of the saddle C, which may be of any approved construction. It will be observed that the supporter extends not only forwardly from the saddle, but upwardly, so that its hook A' is located above the level of the saddle. However, the particular inclination and elevation of the supporter may be varied according to circumstances. The upwardly-bowed loop A' of the supporter lies in a vertical plane, and, as shown, the loop is flattened in a horizontal plane to make it more yielding; but whatever the specific form and construction of the supporter may be it will be made so that it will yield and constitute a spring.

The hame-collar D, which may also be of any approved construction, is suspended, as it were, from the supporter by suspension means, such as the strap E, which is passed under the top of the collar and formed in its ends with holes, which adapt them to be hooked onto the hook A. It will be understood, of course, that the supporter and strap E are constructed and arranged so that when the horse is carrying his head and neck in the normal or medium position the supporter will hold the hame-collar D enough above his neck to prevent it from chafing the same.

It is obvious that, if desired, the hook of the supporter may also be used as a point for the attachment of the rear end of the check-rein.

It is apparent that the supporter may be made in a variety of forms and adapted in a variety of ways to be secured to the chain-bow of the saddle. Thus instead of threading the rear end of the supporter for securing it to the chain-bow it might be adapted to be bolted thereto or it might be constructed to be clipped thereto. I would therefore have it understood that I do not limit myself to the exact construction herein shown and described, but hold myself at liberty to make such variations therefrom as fairly fall within the spirit and scope of my invention.

Having fully described my invention, what I claim as new, and desire to secure by Letters Patent, is—

The combination with a saddle provided with a chain-bow located upon its top, of a hame-collar, and a yielding supporter secured at its rear end to the said bow and extended forward therefrom beyond the forward edge of the said saddle, and constructed at its forward end to extend over the said collar which is suspended from it, the said supporter exerting a constant upward draft on the collar which is yieldingly supported.

In testimony whereof I have signed this specification in the presence of two subscribing witnesses.

WILLIAM N. HOUGHTALING.

Witnesses:
LILLIAN D. KELSEY,
GEORGE D. SEYMOUR.